(12) United States Patent
Mori

(10) Patent No.: US 11,015,676 B2
(45) Date of Patent: May 25, 2021

(54) VEHICLE

(71) Applicant: SUZUKI MOTOR CORPORATION, Hamamatsu (JP)

(72) Inventor: Masaki Mori, Hamamatsu (JP)

(73) Assignee: SUZUKI MOTOR CORPORATION

( * ) Notice: Subject to any disclaimer, the term of this patent is extended or adjusted under 35 U.S.C. 154(b) by 0 days.

(21) Appl. No.: 16/434,928

(22) Filed: Jun. 7, 2019

(65) Prior Publication Data

US 2019/0383354 A1    Dec. 19, 2019

(30) Foreign Application Priority Data

Jun. 13, 2018  (JP) .............................. JP2018-113087

(51) Int. Cl.

| F16F 15/26 | (2006.01) |
| F02B 61/02 | (2006.01) |
| B60T 8/17 | (2006.01) |
| F02B 77/00 | (2006.01) |
| F01M 13/04 | (2006.01) |
| F02B 67/04 | (2006.01) |

(52) U.S. Cl.
CPC .......... *F16F 15/264* (2013.01); *B60T 8/1706* (2013.01); *F01M 13/04* (2013.01); *F02B 61/02* (2013.01); *F02B 67/04* (2013.01); *F02B 77/00* (2013.01)

(58) Field of Classification Search
CPC ...... F16F 15/264; B60T 8/1706; F01M 13/04; F02B 61/02; F02B 67/04; F02B 77/00
USPC ....................................................... 123/192.2
See application file for complete search history.

(56) References Cited

U.S. PATENT DOCUMENTS

| 4,856,486 A * | 8/1989 | Mori | ................... F01M 13/025 |
| | | | 123/572 |
| 2007/0107688 A1* | 5/2007 | Matsuda | ................ F01M 13/04 |
| | | | 123/192.2 |
| 2015/0114336 A1* | 4/2015 | Matsuda | .................. F01M 1/02 |
| | | | 123/196 A |
| 2019/0322254 A1* | 10/2019 | Yamada | .................... B60T 8/34 |

FOREIGN PATENT DOCUMENTS

JP        2007078080 A     3/2007

* cited by examiner

*Primary Examiner* — Joseph J Dallo
*Assistant Examiner* — Yi-Kai Wang
(74) *Attorney, Agent, or Firm* — Barnes & Thornburg LLP

(57) ABSTRACT

To provide a vehicle that includes a balancer mechanism for reducing vibration of the engine and can leave a space margin for increasing the fuel tank in size and/or arranging equipment or components at the rear of the cylinder and above the crankcase. A vehicle includes: an engine mounted on a body frame. The engine comprises a crankcase with a ceiling wall, a crankshaft provided in the crankcase, and a balancer mechanism for reducing vibration of the engine by power transmitted from the crankshaft. The balancer mechanism comprises an idler gear disposed behind the crankshaft and rotated by power transmitted from the crankshaft, and a first balancer disposed behind the idler gear and rotated by power transmitted from the idler gear. The idler gear and the first balancer are disposed along the ceiling wall.

12 Claims, 8 Drawing Sheets

VEHICLE

CROSS-REFERENCE TO RELATED APPLICATIONS

This application claims the benefit of priority of Japanese Patent Application No. 2018-113087, filed on Jun. 13, 2018, the entire contents of which are incorporated herein by reference.

BACKGROUND OF THE INVENTION

Field of the Invention

The present invention relates to a vehicle.

Description of the Related Art

There is known an internal combustion engine that is equipped with a crankshaft and two balancers sandwiching the crankshaft between them.

This internal combustion engine rotates the two balancers in the opposite directions to each other. Thus, the rotational power of the crankshaft is directly transmitted to one of the two balancers, and the rotational power inverted by the idler gear is transmitted to the other balancer (e.g., JP 2007-078080 A).

The idler gear and the balancer rotated with the idler gear of the conventional internal combustion engine are arranged along the cylinder and arranged in the direction in which the center line of the cylinder bore extends.

Such an arrangement of the idler gear and the balancer reduces the spatial margin behind the cylinder and above the crankcase. For instance, in the case of a motorcycle, such reduction in spatial margin hinders an increase in capacity of the fuel tank and hinders from leaving an installation space for equipment such as an anti-lock brake system.

SUMMARY OF THE INVENTION

To solve the problems described above, it is an object of the present invention to provide a vehicle that includes a balancer mechanism for reducing vibration of the internal combustion engine and can leave a space margin for increasing the fuel tank in size and/or arranging equipment or components at the rear of the cylinder and above the crankcase.

To achieve the above object, an aspect of the present invention provides a vehicle includes: a body frame and an internal combustion engine mounted on the body frame. The internal combustion engine comprises a crankcase with a ceiling wall, a crankshaft provided and rotatably supported in the crankcase, and a balancer mechanism provided in the crankcase and configured to reduce vibration of the internal combustion engine by power transmitted from the crankshaft. The balancer mechanism comprises an idler gear disposed behind the crankshaft and rotated by power transmitted from the crankshaft, and a balancer disposed behind the idler gear and rotated by power transmitted from the idler gear. The idler gear and the balancer are disposed along the ceiling wall.

According to the present invention, it is possible to provide a vehicle that includes a balancer mechanism for reducing vibration of the internal combustion engine and can leave a space margin for increasing the fuel tank in size and/or arranging equipment or components at the rear of the cylinder and above the crankcase.

DETAILED DESCRIPTION

Hereinafter, an embodiment of a vehicle according to the present invention will be described with reference to FIG. 1 to FIG. 8. The same reference signs are given for identical or equivalent components in each figure.

Figure 1:
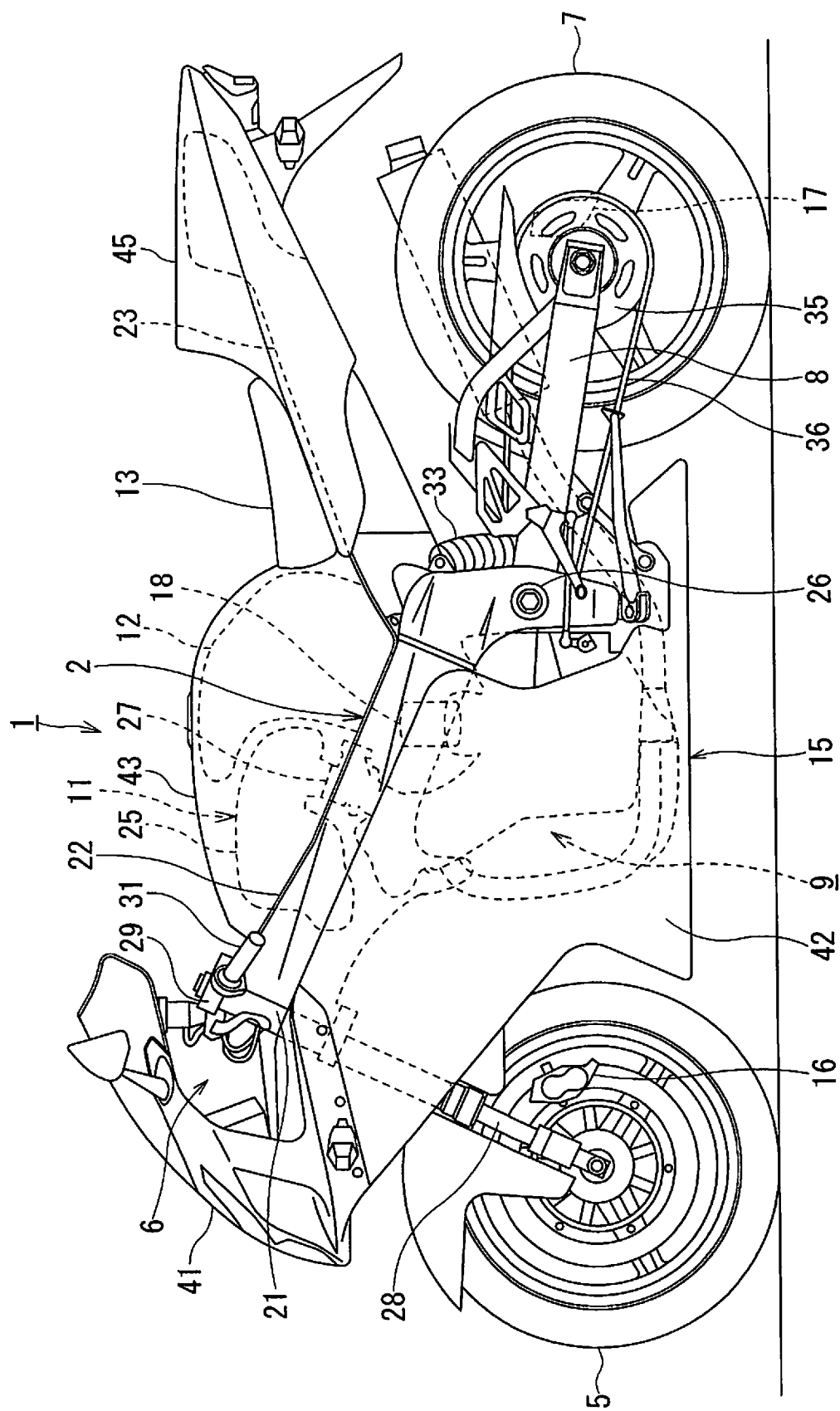
FIG. 1 is a left side view illustrating a vehicle according to an embodiment of the present invention.

FIG. 1 is a left side view illustrating the vehicle according to the embodiment of the present invention.

In the present embodiment, directional terms such as front, rear, upper, upward, lower, downward, right, and left are used with reference to a rider (operator or driver) of the vehicle. The same holds true for an internal combustion engine, and the directional terms for the internal combustion engine are used with reference to the vehicle mounting state.

As shown in FIG. 1, the vehicle according to the present embodiment is, e.g., a straddle type and is a motorcycle 1. The motorcycle 1 according to the present embodiment includes a body frame 2 extending in the front-and-rear direction of the motorcycle 1 (i.e., in the vehicle longitudinal direction), a front wheel 5 disposed in front of the body frame 2, a steering mechanism 6 disposed at the front end portion of the body frame 2 and rotatably supporting the front wheel 5, a rear wheel 7 disposed behind the body frame 2, a swing arm 8 disposed at the rear of the body frame 2 and rotatably supporting the rear wheel 7, and an internal combustion engine 9 (hereinafter simply referred to as the engine 9) mounted on the body frame 2.

The motorcycle 1 further includes an intake system 11 for purifying intake air (i.e., air sucked into the engine 9) and supplying an air-fuel mixture of a required flow rate to the engine 9, a fuel tank 12 for storing fuel to be supplied to the engine 9, a seat 13 for seating a rider, and a cowling 15 covering at least a part of the body frame 2.

The motorcycle 1 further includes a front-wheel brake 16 for braking the rotation of the front wheel 5, a rear-wheel brake 17 for braking the rotation of the rear wheel 7, an anti-lock brake system 18 for preventing the front-wheel brake 16 and the rear-wheel brake 17 from locking up during braking.

The body frame 2 is, e.g., a so-called cradle type. The body frame 2 includes a steering head pipe 21 disposed at the front end of the body frame 2, a pair of right and left main frames 22 branching to the right and left immediately behind the steering head pipe 21 and extending rearward, and a pair of right and left seat rails 23 connected to the rear end of the main frames 22 and extending gently rearward.

The steering head pipe 21 steerably supports the steering mechanism 6. The steering head pipe 21 is the rotation center of the steering mechanism 6 and supports the steering mechanism 6 on the body frame 2.

The right and left main frames 22 are bent. That is, each main frame 22 include an elongated straight portion that branches off immediately behind the steering head pipe 21 to widen the distance between the right and left main frames 22 to substantially the same extent as the lateral width of the engine and gently slopes downward toward the rear of the motorcycle 1, and a short straight portion that is connected to the elongated straight portion and extends downward. The right and left main frames 22 support the engine 9 disposed below the elongated straight portions and in front of the short straight portions so as to hold the engine 9. The right and left main frames 22 support the air cleaner 25 disposed above the front half of the elongated straight portions, support the fuel tank 12 above the rear half of the elongated straight portions, and support a pivot shaft 26 extending in the vehicle width direction between the short straight portions. The pivot shaft 26 swingably supports the swing arm 8.

The engine 9 is disposed behind the front wheel 5 and below the main frames 22, and occupies the central lower portion of the motorcycle 1. The engine 9 includes plural, e.g., four cylinder bores (i.e., cylinders, FIG. 3) arranged in the vehicle width direction of the motorcycle 1. That is, the engine 9 is a parallel multi-cylinder engine, e.g., a parallel four-cylinder engine.

The intake system 11 of the engine 9 includes an air cleaner 25 for purifying the air sucked into the engine 9, and a throttle body 27 for injecting fuel into the purified air having passed through the air cleaner 25 to form an air-fuel mixture and changing the flow rate of intake air (mixture) supplied to the engine 9.

The air cleaner 25 is disposed above the front half of the body frame 2. The air cleaner 25 is connected to the intake side of the engine 9 via the throttle body 27. The air cleaner 25 filters and purifies the intake air. The air cleaner 25 is sandwiched between the right and left main frames 22.

The throttle body 27 is provided between the air cleaner 25 and the engine 9. In the flow of the intake air supplied to the engine 9, the air cleaner 25 is connected to the upstream side of the throttle body 27 and the engine 9 is connected to the downstream side of the throttle body 27.

The fuel tank 12 is disposed above the front half of the body frame 2 and behind the air cleaner 25.

The steering mechanism 6 includes a non-illustrated steering shaft penetrating the steering head pipe 21 and serving as the rotation center of the steering mechanism 6, a pair of right and left front forks 28 extending vertically, and handle bars 29 connected to the upper ends of the respective front forks 28 and extending to the right and left of the motorcycle 1.

The handle bars 29 are equipped with handle grips 31 to be grasped by a rider. The right handle grip 31 is a throttle grip. The twisting operation amount of the throttle grip changes the opening degree of the throttle body 27 (more specifically, a throttle valve), and consequently changes the output of the engine 9.

The front end portion of the swing arm 8 is swingably connected to the body frame 2 with the pivot shaft 26. The rear end portion of the swing arm 8 rotatably supports the rear wheel 7. A rear cushion unit 33 is bridged between the swing arm 8 and the body frame 2. The rear cushion unit 33 buffers the force transmitted from the rear wheel 7 to the body frame 2.

The rear wheel 7 includes a driven sprocket 35. The drive chain 36 is wrapped around the driven sprocket 35 and transmits a power from the engine 9 to the rear wheel 7.

The seat 13 is disposed above the rear half of the body frame 2.

The cowling 15 covers and hides the body frame 2 from, e.g., the front portion to the central lower portion of the vehicle body. The cowling 15 has a streamline shape, by which the cowling 15 reduces air resistance during running of the motorcycle 1 and protects a rider from running wind pressure. The cowling 15 includes a front cover 41 covering the front portion of the motorcycle 1, a pair of right and left side covers 42 covering the side of the engine 9, an air cleaner cover 43 covering the air cleaner 25 and the fuel tank 12, and a rear cover 45 supporting the seat 13 and covering the rear of the motorcycle 1.

The front-wheel brake 16 applies a brake to the front wheel 5 when a non-illustrated front brake lever provided on the right handle grip 31 is gripped. The front-wheel brake 16 releases the brake of the front wheel 5 when the operation on the front brake lever is released (or canceled).

The rear-wheel brake 17 applies a brake to the rear wheel 7 when a non-illustrated rear brake lever provided on a non-illustrated right footrest is stepped on. The rear-wheel brake 17 releases the brake of the rear wheel 7 when the operation on the rear brake lever is released.

The anti-lock brake system 18 is disposed in the space between the fuel tank 12 and the engine 9. The anti-lock brake system 18 adjusts the braking force according to the running state of the motorcycle 1. For instance, the anti-lock brake system 18 detects the difference between the vehicle speed and the rotational speed of the rear wheel 7 or the front wheel 5. When this difference increases and slip is expected to occur, the anti-lock brake system 18 reduces the braking force of the front wheel brake 16 and the braking force of the rear wheel brake 17 so as to avoid slipping.

Next, the engine 9 according to the present embodiment will be described in detail.

Figure 2:
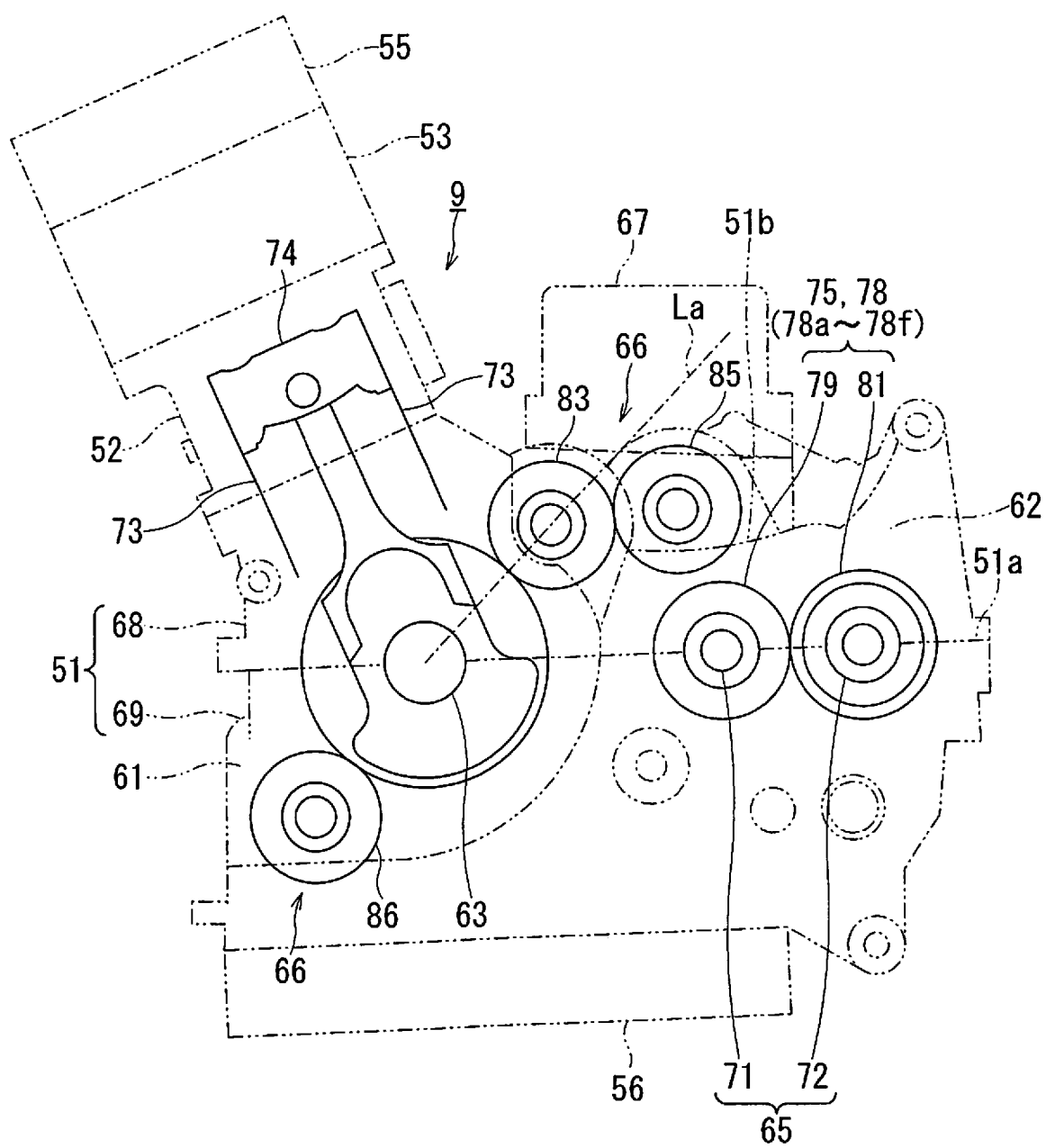
FIG. 2 is a left side view of an internal combustion engine according to the embodiment of the present invention.

FIG. 2 is a left side view of the internal combustion engine according to the embodiment of the present invention.

As shown in FIG. 2, the engine 9 according to the present embodiment includes a crankcase 51, a cylinder 52, a cylinder head 53, a head cover 55, and an oil pan 56.

A transmission case is integrated with the crankcase 51. A crank chamber 61 is partitioned in the front half portion of the crankcase 51 and a transmission chamber 62 is partitioned in the rear half portion of the crankcase 51. The crank chamber 61 rotatably accommodates the crankshaft 63, and the transmission chamber 62 accommodates a transmission 65. The crank chamber 61 and the transmission chamber 62 are juxtaposed in the front-and-rear direction of the engine 9. The crank chamber 61 and the transmission chamber 62 are adjacent to each other such that a partition inside the crankcase 51 is interposed between both chambers 61 and 62.

A balancer mechanism 66 is provided and accommodated in the crankcase 51. The balancer mechanism 66 reduces the periodic rotational vibration of the crankshaft 63 by the power transmitted from the crankshaft 63.

A breather chamber 67 is provided in the crankcase 51. The breather chamber 67 is disposed on the top surface of the crankcase 51 and behind the cylinder 52. The breather chamber 67 separates the oil contained in the blowby gas in the crankcase 51.

The crankcase 51 includes an upper case 68 as its upper half and a lower case 69 as its lower half. The upper case 68 and the lower case 69 cooperate with each other to partition the crank chamber 61 and the transmission chamber 62. The upper case 68 and the lower case 69 are combined with each other at a mating surface 51*a*. The rotation center line of the crankshaft 63, the rotation center line of the input shaft 71 (i.e., countershaft 71) of the transmission 65, and the rotation center line of the output shaft 72 (i.e., driveshaft 72) of the transmission 65 are positioned on an imaginary (i.e., virtual) plane passing through the mating surface 51*a*. The cylinder 52 and the upper case 68 may be an integrated cylinder block.

The cylinder 52 is provided on the front end portion of the top surface of the crankcase 51. The cylinder 52 is inclined slightly forward from the upright state. In other words, the cylinder 52 is inclined such that its top side (i.e., the side of the head cover 55) is on the front side than its bottom side (i.e., the side of the crankcase 51). The cylinder 52 includes plural cylinder bores 73 aligned in one row in the width direction of the engine 9. All the cylinder bores 73 are arranged such that the center line of every cylinder bore 73 is substantially on the same imaginary plane. A piston 74 is accommodated in each cylinder bore 73. The pistons 74 are accommodated in the corresponding cylinder bores 73 so as to be able to reciprocate in the direction towards and away from the crankshaft 63 (i.e., in the radial direction of the crankshaft 63). The center line of every cylinder bore 73, i.e., the reciprocating direction of every piston 74 is inclined slightly forward, similar to the cylinder 52.

The cylinder head 53 closes the upper portions of the cylinder bores 73, and partitions non-illustrated combustion chambers between the cylinder head 53 and the pistons 74. The engine 9 reciprocates the pistons 74 by periodically combusting the air-fuel mixture in the corresponding combustion chambers.

The crankshaft 63 is held between the upper case 68 and the lower case 69 at the mating surface 51*a* so as to be rotatably supported. The crankshaft 63 extends in the width direction of the engine 9. In other words, the rotation center line of the crankshaft 63 extends in the width direction of the engine 9. The crankshaft 63 is located at the intersection of the mating surface 51*a* and the extension line of the center lines of the cylinder bores 73 or is located in the vicinity of this intersection. The crankshaft 63 is connected to each piston 74 via a connecting rod. The crankshaft 63 converts the reciprocating motion of each piston 74 into rotational motion.

The transmission 65 converts the rotation speed of the crankshaft 63 transmitted to its input side depending on the selected transmission ratio, and rotates its output shaft at the converted rotation speed. The transmission 65 is a so-called dog-clutch-type manual transmission. The transmission 65 includes the countershaft 71 on the input side connected to the crankshaft 63, the driveshaft 72 on the output side, transmission gears 75 for changing the rotation speed and transmitting the changed rotation speed from the countershaft 71 to the driveshaft 72, and a non-illustrated shift mechanism.

The countershaft 71 and the driveshaft 72 extend in parallel to the crankshaft 63. That is, the countershaft 71 and the driveshaft 72 extend in the width direction of the engine 9. In other words, the rotation center line of the countershaft 71 and the rotation center line of the driveshaft 72 are arranged in parallel to the rotation center line of the crankshaft 63. The rotation center line of the countershaft 71 and the rotation center line of the driveshaft 72 extend in the width direction of the engine 9.

The rotation center line of the countershaft 71 passes through the mating surface 51*a*, and the countershaft 71 transmits power between the crankshaft 63 and the driveshaft 72. A non-illustrated clutch mechanism is provided at one of the end portions of the countershaft 71, e.g., at its right end portion. The clutch mechanism integrally and rotatably supports a non-illustrated primary driven gear. The primary driven gear meshes with a non-illustrated primary drive gear that is integrally and rotatably provided on the crankshaft 63. The clutch mechanism rotatably integrates or rotatably drives the primary driven gear with respect to the countershaft 71 so as to transmit power between the crankshaft 63 and the countershaft 71 or cut off (i.e., release) the transmission of the power between both.

The driveshaft 72 is disposed behind the countershaft 71. That is, the driveshaft 72 is farther from the crankshaft 63 than the countershaft 71. The other of the end portions, e.g., the left end portion of the driveshaft 72 protrudes from the left side-wall of the lower case 69 toward the outside of the transmission chamber 62. A non-illustrated drive sprocket is fixed to the end portion of the driveshaft 72 positioned outside the transmission chamber 62. A drive chain 36 is wrapped around the drive sprocket. The drive sprocket transmits power to the rear wheel 7 via the drive chain 36.

The transmission gears 75 include plural gear pairs 78. Each gear pair 78 is composed of a counter gear 79 mounted on and supported by the countershaft 71 and a drive gear 81 mounted on and supported by the driveshaft 72 so as to constantly mesh with the counter gear 79. Each gear pair 78 has a transmission ratio different from the other gear pairs 78, e.g., from the first-speed gear pair 78*a* to the sixth-speed gear pair 78*f*.

The shift mechanism includes dog clutches attached to the gear pairs 78 of the transmission gear 75. The shift mechanism alternatively selects a gear pair 78 that changes the rotation speed transmitted (i.e., inputted) from the countershaft 71 and then transmits (i.e., outputs) the changed rotation speed to the driveshaft 72 via the dog clutch. The transmission ratio is determined by which gear pair 78 is selected, and the selected gear pair 78 transmits the rotational speed (i.e., power or torque) in accordance with its transmission ratio from the countershaft 71 to the driveshaft 72. All the remaining transmission gear pairs 78 idle the drive gear 81 or the counter gear 79 and do not transmit the power (i.e., cut off transmission of the power).

The balancer mechanism 66 is, i.e., a so-called biaxial secondary balancer. The balancer mechanism 66 includes a pair of (two-axis) balancers 85 and 86 configured to rotate at twice the rotational speed of the crankshaft 63, and reduces the secondary vibration caused by the rotation of the crankshaft 63.

The balancer mechanism 66 includes an idler gear 83 disposed behind the crankshaft 63 and rotated by the power transmitted from the crankshaft 63, a first balancer 85 disposed behind the idler gear 83 and rotated by the power transmitted from the idler gear 83, and a second balancer 86 disposed in front of the crankshaft 63 and rotated by the power transmitted from the crankshaft 63.

In other words, the pair of balancers 85 and 86 are disposed in front of and behind the crankshaft 63 with the crankshaft 63 interposed between them. The second balancer 86 disposed in front of the crankshaft 63 rotates at twice the rotational speed of the crankshaft 63 in the direction opposite to the rotational direction of the crankshaft 63. The first balancer 85 disposed behind the crankshaft 63 rotates at twice the rotational speed of the crankshaft 63 in the same rotation direction as the crankshaft 63.

The first balancer 85 and the second balancer 86 extend in parallel to the crankshaft 63. That is, the first balancer 85 and the second balancer 86 extend in the width direction of the engine 9. In other words, those components are arranged such that the respective rotation center lines of the idler gear 83, the first balancer 85, and the second balancer 86 are parallel to the rotation center line of the crankshaft 63. The respective rotation center lines of the idler gear 83, the first balancer 85, and the second balancer 86 extend in the width direction of the engine 9.

The first balancer 85 is located at a position farther from the cylinder bores 73 than the idler gear 83. The rotation center line of the first balancer 85 is located at a position farther from the cylinder bores 73 than the rotation center line of the idler gear 83. The rotation center line of the first balancer 85 is located at a position farther from the cylinder bores 73 than the idler gear 83. In other words, the idler gear 83 and the first balancer 85 are sequentially arranged in the direction crossing the center lines of the cylinder bores 73, i.e., in the direction away from the cylinder bores 73 in a side view of the engine 9.

The idler gear 83 and the first balancer 85 are arranged along the ceiling wall 51b of the crankcase 51. That is, the idler gear 83 and the first balancer 85 are adjacent to the ceiling wall 51b of the crankcase 51.

The first balancer 85 is disposed such that the rotation center line of the first balancer 85 is below the imaginary line segment La connecting the rotation center line of the crankshaft 63 and the rotation center line of the idler gear 83. It is more preferable that the entirety of the first balancer 85 is disposed below the imaginary line segment La.

In a side view of the crankcase 51, the first balancer 85 covers at least a part of the breather chamber 67. In other words, in a side view of the crankcase 51, the breather chamber 67 covers at least a part of the first balancer 85. The covering between the first balancer 85 and the breather chamber 67 may be a partial or overall superimposition. That is, at least a part of the first balancer 85 may overlap the breather chamber 67 or at least a part of the breather chamber 67 may overlap the first balancer 85.

Figure 3:
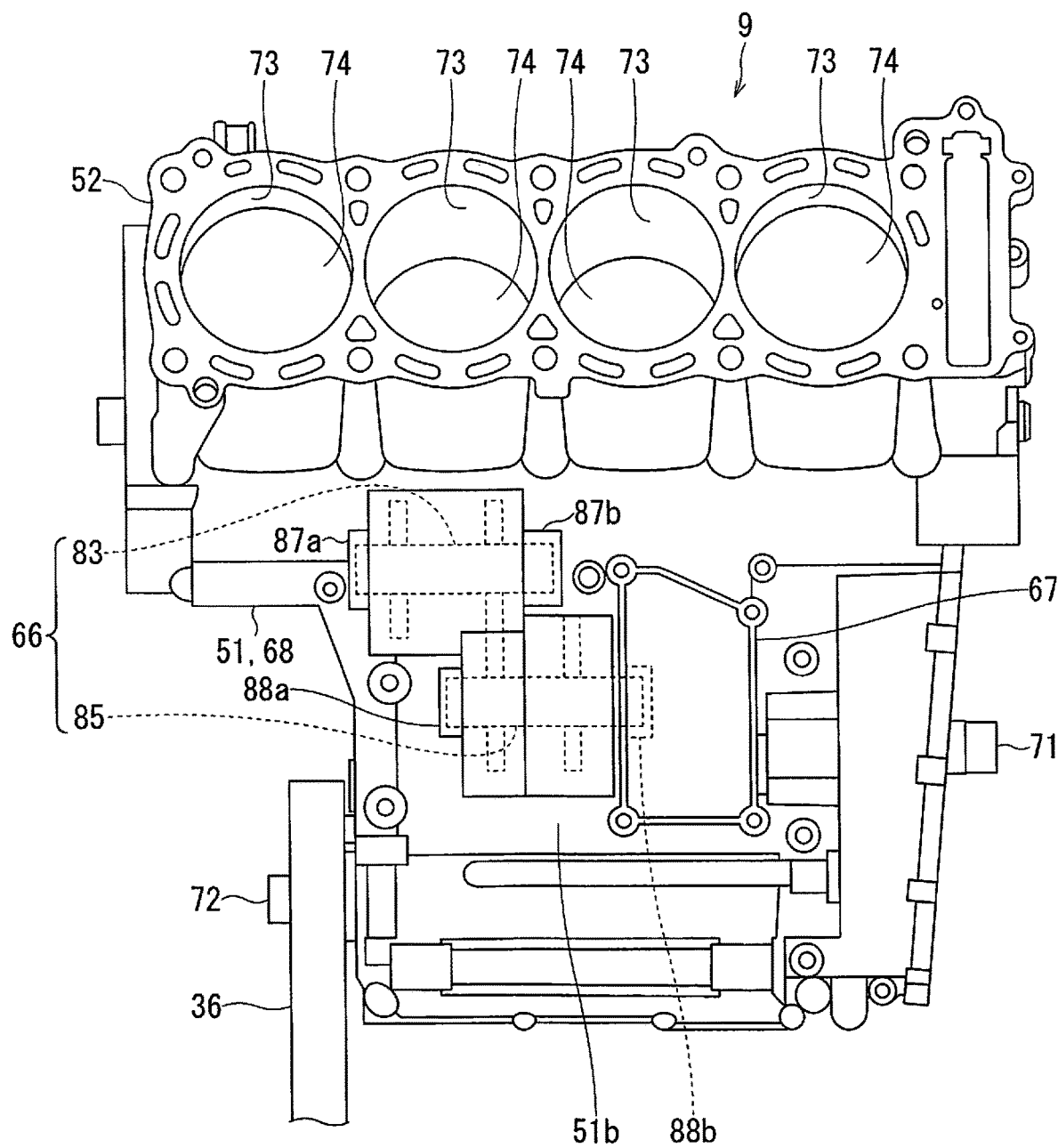
FIG. 3 is a plan view of the internal combustion engine according to the embodiment of the present invention.

FIG. 3 is a plan view of the internal combustion engine according to the embodiment of the present invention.

As shown in FIG. 3, the balancer mechanism 66 of the engine 9 according to the present embodiment includes a pair of idler bearings 87a and 87b for rotatably supporting the idler gear 83 on the crankcase 51 and a pair of balancer bearings 88a and 88b for rotatably supporting the first balancer 85 on the crankcase 51.

The pair of idler bearings 87a and 87b and the pair of balancer bearings 88a and 88b are integrally formed with the crankcase 51.

The left balancer bearing 88a is offset with respect to any of the idler bearings 87a and 87b in the direction along the rotation center line of the crankshaft 63. The right balancer bearing 88b is also offset with respect to any of the idler bearings 87a and 87b in the direction along the rotational center line of the crankshaft 63. In other words, the left balancer bearing 88a is not aligned with any of the idler bearings 87a and 87b in the direction along the rotational center line of the crankshaft 63, and the right balancer bearing 88b is not aligned with any of the idler bearings 87a and 87b in the direction along the rotational center line of the crankshaft 63.

It is sufficient that at least one of the pair of balancer bearings 88a and 88b is offset with respect to the pair of idler bearings 87a and 87b in the direction along the rotation center line of the crankshaft 63. Specifically, when the left balancer bearing 88a is offset with respect to the left idler bearing 87a, the right balancer bearing 88b may be aligned with the right idler bearing 87b. The direction of the offset may be the right direction of the crankcase 51 or the left direction of the crankcase 51. Additionally, when the right balancer bearing 88b is offset with respect to the right idler bearing 87b, the left balancer bearing 88a may be aligned with the left idler bearing 87a. The direction of the offset may be the right direction of the crankcase 51 or the left direction of the crankcase 51.

The positional relationship between the balancer bearings 88a and 88b and the idler bearings 87a and 87b is similar to the positional relationship between both shaft-end portions of the idler gear 83 and both shaft-end portions of the first balancer 85.

The first balancer 85 is closer to the center in the width dimension of the crankcase 51 than the idler gear 83. Specifically, the first balancer 85 is closer to the center in the width dimension of the crankcase 51 than the idler gear 83 that is disposed closer to the left side of the crankcase 51.

The breather chamber 67 is offset to the right side of the engine 9. The first balancer 85 is disposed on the left side of the breather chamber 67.

The right balancer bearing 88b is formed integrally with the wall partitioning the breather chamber 67. Specifically, the right balancer bearing 88b is integrally formed with the left side-wall of the breather chamber 67.

The arrangement of the idler gear 83, the first balancer 85, and the breather chamber 67 may be reversed in the right-and-left direction of the engine 9. That is, it suffices that the first balancer 85 is closer to the center of the crankcase 51 than the idler gear 83 that is disposed closer to the right side of the crankcase 51. The breather chamber 67 may be offset to the left side of the engine 9, and the first balancer 85 may be disposed on the right side of the breather chamber 67. In other words, it suffices that the breather chamber 67 is offset to either the right or left side of the engine 9, and the first balancer 85 is arranged on the other of the right and left sides of the breather chamber 67. The left balancer bearing 88a may be formed integrally with the wall that partitions the breather chamber 67. That is, it suffices that one of the pair of balancer bearings 88a and 88b is formed integrally with the wall that partitions the breather chamber 67.

Figure 4:
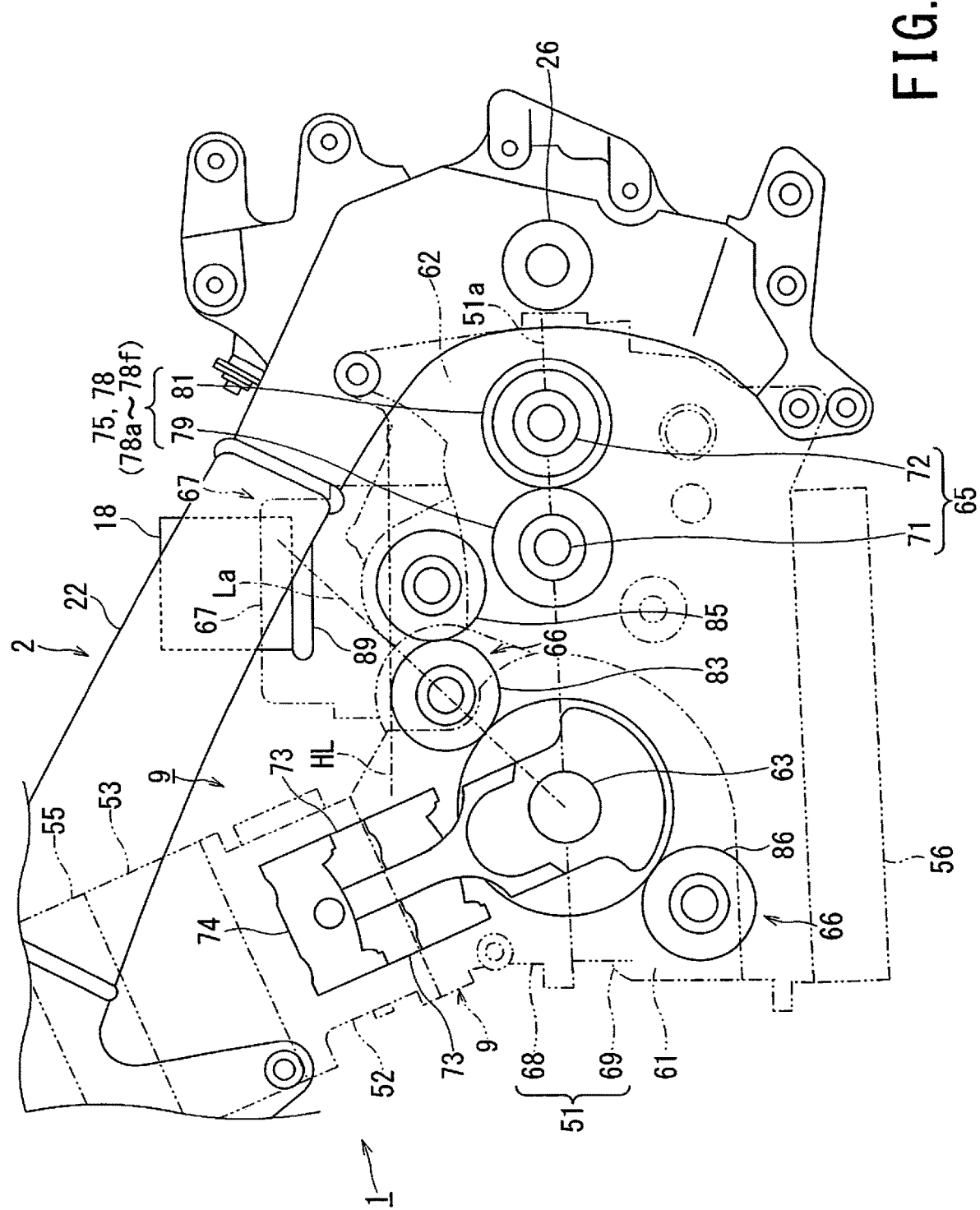
FIG. 4 is a partial left side view of the vehicle according to the embodiment of the present invention.

FIG. 4 is a partial left side view of the vehicle according to the embodiment of the present invention.

Figure 5:
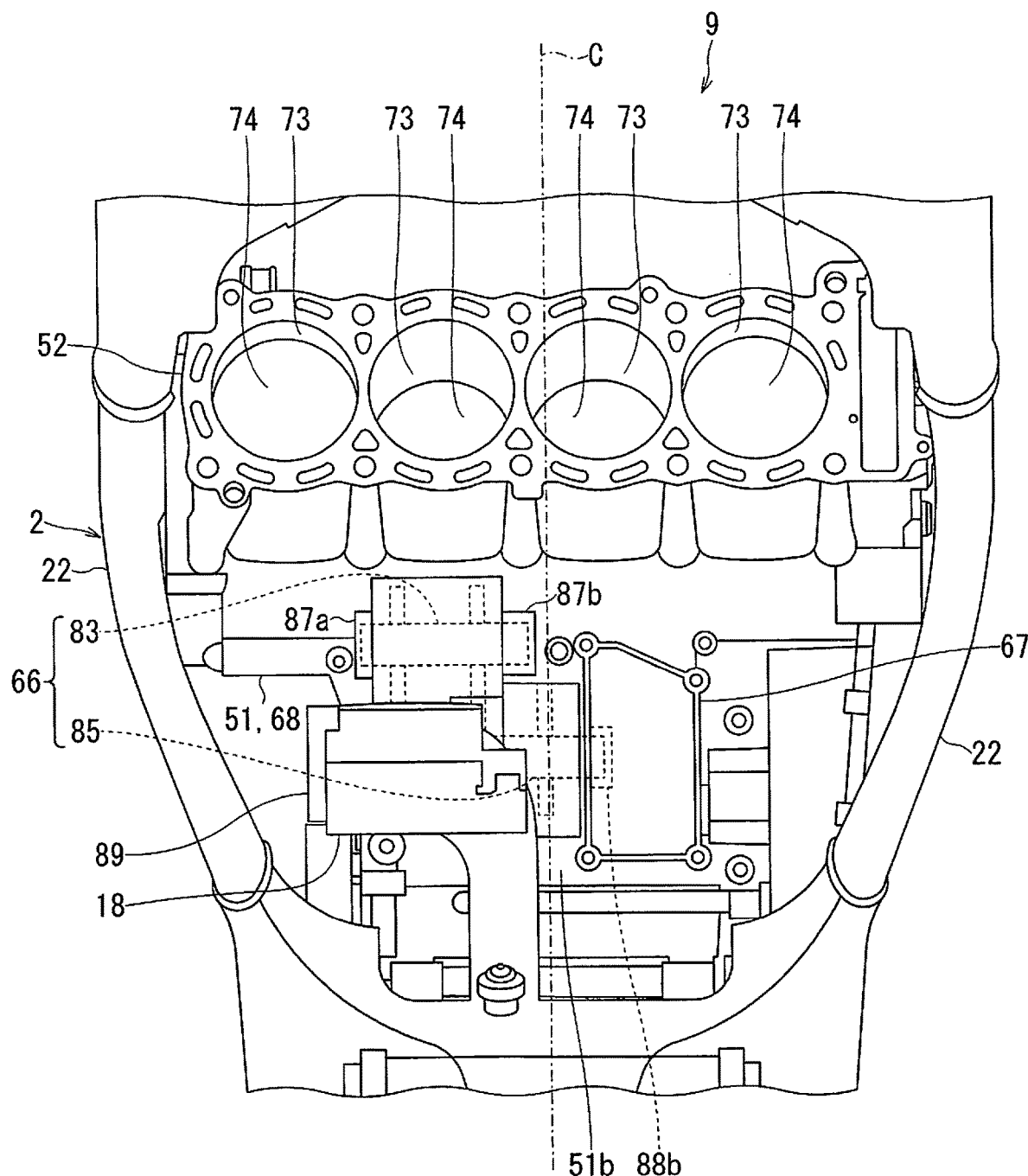
FIG. 5 is a partial plan view of the vehicle according to the embodiment of the present invention.

FIG. 5 is a partial plan view of the vehicle according to the embodiment of the present invention.

As shown in FIG. 4 and FIG. 5 in addition to FIG. 2 and FIG. 3, the motorcycle 1 according to the present embodiment includes the anti-lock brake system 18. This anti-lock brake system 18 is supported by the body frame 2, covers at least a part of the first balancer 85 in a plan view of the body frame 2 (FIG. 5), and covers at least a part of the breather chamber 67 in a side view of the body frame 2 (FIG. 4).

The right and left main frames 22 of the body frame 2 are united and connected at the rear end portion of the elongated straight portion and at the upper end portion of the short straight portion. The junction portion of the right and left main frames 22 is positioned on the center line C extending in the front-and-rear direction of the motorcycle 1 and the body frame 2.

The anti-lock brake system 18 is supported by a bracket 89 that extends forward from the junction portion of the left main frame 22 and reaches above the crankcase 51 of the engine 9, above the first balancer 85, behind the cylinder 52, and beside the breather chamber 67. The anti-lock brake system 18 is located right above the first balancer 85 and reaches right above the idler gear 83. That is, the anti-lock brake system 18 also covers at least a part of the idler gear 83 in a plan view of the body frame 2.

In a plan view of the body frame 2, the anti-lock brake system 18 covers at least a part of the first balancer 85. In other words, in a plan view of the crankcase 51, the first balancer 85 covers at least a part of the anti-lock brake system 18. Note that the covering between the anti-lock brake system 18 and the first balancer 85 may be a partial or overall superimposition. That is, at least a part of the anti-lock brake system 18 may overlap the first balancer 85 or at least a part of the first balancer 85 may overlap the anti-lock brake system 18.

Further, in a side view of the body frame 2, the anti-lock brake system 18 covers at least a part of the breather chamber 67. In other words, in a side view of the crankcase 51, the breather chamber 67 covers at least a part of the anti-lock brake system 18. Note that the covering between the anti-lock brake system 18 and the breather chamber 67 may be a partial or overall superimposition. That is, at least a part of the anti-lock brake system 18 may overlap the breather chamber 67 or at least a part of the breather chamber 67 may overlap the anti-lock brake system 18.

The rotation center line of the first balancer 85 is disposed below the horizontal line HL that is in contact with the upper end of the idler gear 83 in the vehicle mounted state. It is more desirable that the entirety of the first balancer 85 is disposed below the horizontal line HL.

The breather chamber 67 of the engine 9 is offset to the right side from the center line C extending in the front-and-rear direction of the body frame 2. The first balancer 85 is disposed on the left side of the breather chamber 67.

The arrangement of the idler gear 83, the first balancer 85, and the breather chamber 67 may be reversed in the right-and-left direction of the body frame 2. That is, the breather chamber 67 may be offset to the left side from the center line C extending in the front-and-rear direction of the body frame 2, and the first balancer 85 may be disposed on the right side of the breather chamber 67. In other words, it suffices that the breather chamber 67 is offset to either the right or left side from the center line C extending in the front-and-rear direction of the body frame 2, and the first balancer 85 is disposed on the other of the right and left sides of the breather chamber 67.

Next, a lubrication system 91 of the engine 9 will be described.

Figure 6:
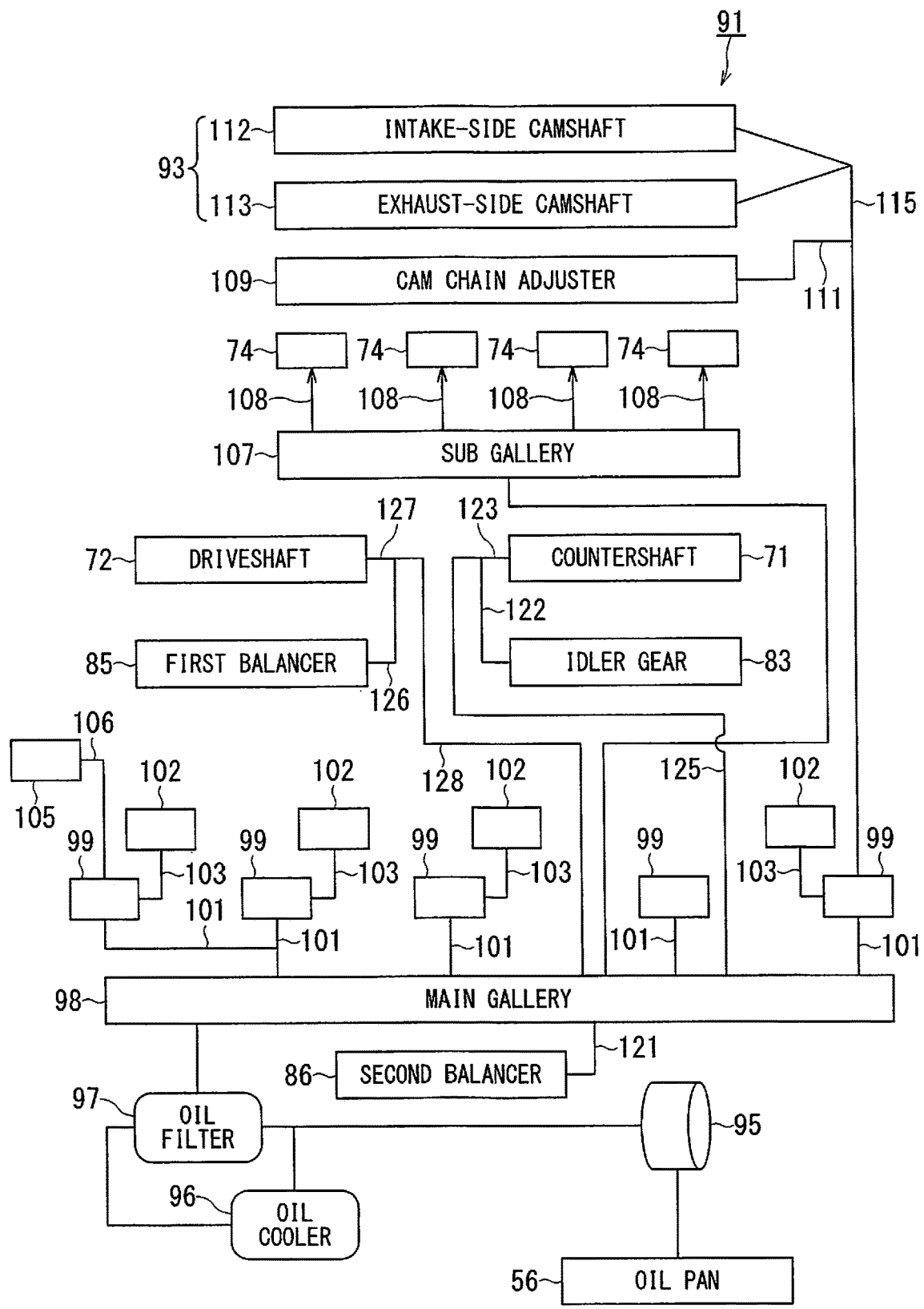
FIG. 6 is a schematic diagram of a lubrication system of the internal combustion engine according to the embodiment of the present invention.

FIG. 6 is a schematic diagram of the lubrication system of the internal combustion engine according to the embodiment of the present invention.

As shown in FIG. 6, the engine 9 according to the present embodiment includes the lubrication system 91 that is provided in the crankcase 51, the cylinder 52 and the cylinder head 53 for circulating the lubricating oil.

In addition, the engine 9 includes an oil pan 56 that is provided at the bottom of the crankcase 51 and stores lubricating oil.

The lubrication system 91 supplies the lubricating oil stored in the oil pan 56 to a lubricating part including the crankshaft 63, the pistons 74, a valve mechanism 93 accommodated in the cylinder head 53, the countershaft 71 of the transmission 65, and the driveshaft 72 of the transmission 65 so as to lubricate and cool them.

The lubrication system 91 includes an oil pump 95 for sucking up the lubricating oil from the oil pan 56, an oil cooler 96 for cooling the lubricating oil discharged from the oil pump 95, an oil filter 97 for removing contaminants (i.e., foreign matters) from the lubricating oil discharged from the oil pump 95 and the lubricating oil cooled by the oil cooler 96, and a main gallery 98 into which the lubricating oil purified by the oil filter 97 flows.

The oil cooler 96 is preferably arranged so as to avoid the position where the oil cooler 96 faces the front fender and the front wheel 5, and thereby the oil cooler 96 is easily exposed to the traveling wind of the motorcycle 1.

The lubrication system 91 includes a main-journal lubricating-oil passage 101 that branches off from the main gallery 98 and supplies the lubricating oil to a journal portion 99 of the crankcase 51 supporting the crankshaft 63, a crankpin lubricating-oil passage 103 for supplying the lubricating oil from the main-journal lubricating-oil passages 101 to a crank pin 102 via a lubricating oil passage inside the crankshaft 63, and a magneto lubricating-oil passage 106 that branches off from the main-journal lubricating-oil passage 101 and supplies the lubricating oil to the magneto 105.

The lubrication system 91 further includes a piston cooling-oil passage 108 (i.e., so-called piston jet) for blowing the lubricating oil, which has arrived from the main gallery 98 via the sub gallery 107, to the piston 74.

The lubrication system 91 further includes an adjuster lubricating-oil passage 111 and a valve-mechanism lubricating-oil passage 115. The adjuster lubricating-oil passage 111 branches off from the main-journal lubricating-oil passage 101 and supplies the lubricating oil to a cam chain adjuster 109. The valve-mechanism lubricating-oil passage 115 branches off from the adjuster lubricating-oil passage 111 to reach the cylinder head 53 and supplies the lubricating oil to an intake-side camshaft 112 and an exhaust-side camshaft 113 of a non-illustrated valve mechanism. The cam chain adjuster 109 adjusts the tension of a non-illustrated cam chain that transmits power from the crankshaft 63 to the intake-side camshaft 112 and the exhaust-side camshaft 113 of the valve mechanism.

The lubrication system 91 further includes a balancer lubricating-oil passage 121 that branches off from the main gallery 98 and supplies the lubricating oil to the second balancer 86.

Figure 7:
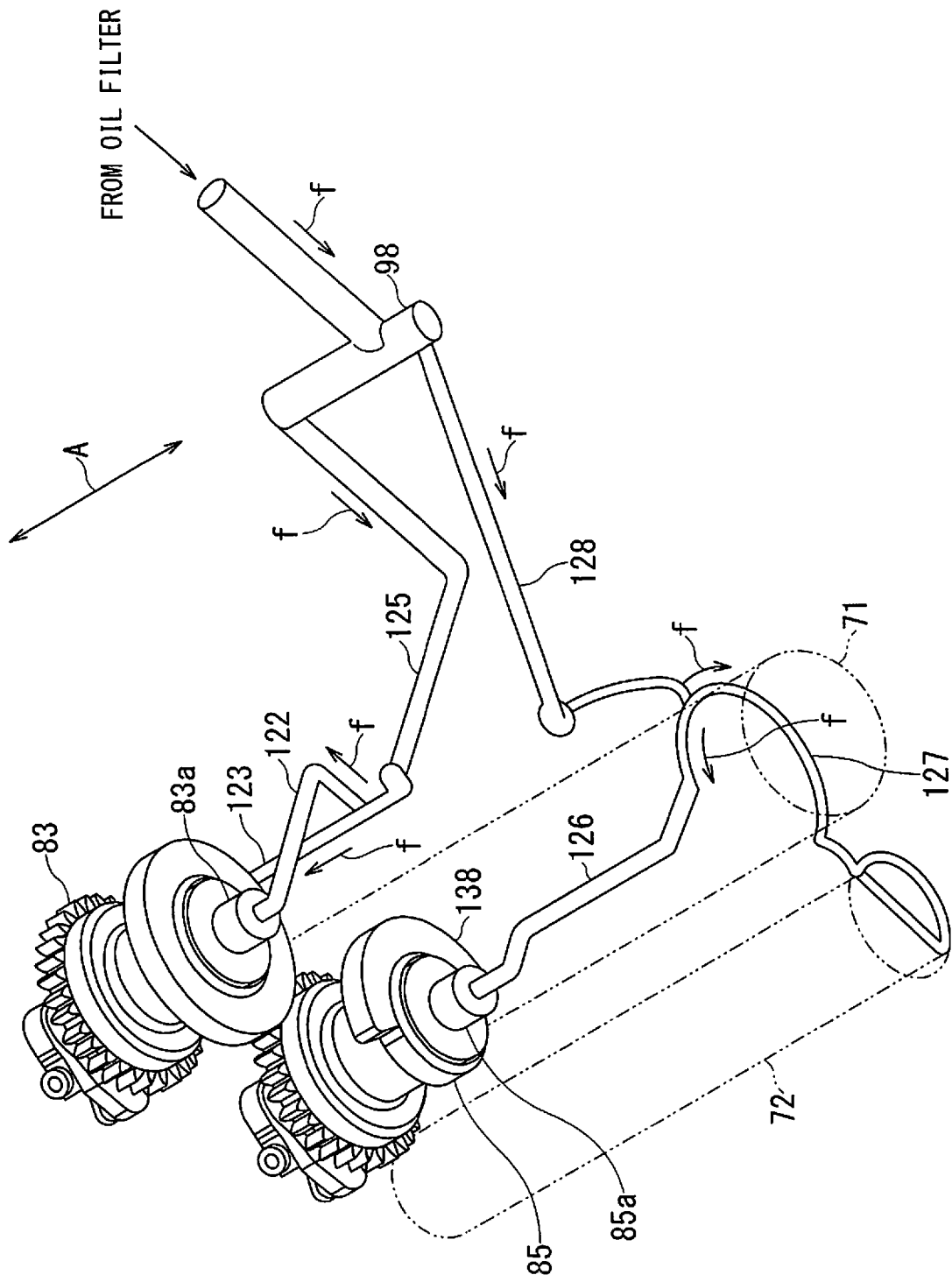
FIG. 7 is a partial perspective view of the lubrication system of the internal combustion engine according to the embodiment of the present invention.

FIG. 7 is a partial perspective view of the lubrication system of the internal combustion engine according to the embodiment of the present invention.

The solid-line arrow "A" in FIG. 7 indicates the direction parallel to the rotation center line of the crankshaft 63. The solid-line arrow "f" in FIG. 7 indicates the flow direction of the lubricating oil in the lubrication system 91.

As shown in FIG. 6 and FIG. 7, the lubrication system 91 of the engine 9 according to the present embodiment includes an idler lubricating-oil passage 122 and a counter lubricating-oil passage 123. The idler lubricating-oil passage 122 branches off from the main gallery 98 so as to supply the lubricating oil to the idler gear 83, and the counter lubricating-oil passage 123 branches off from the idler lubricating-oil passage 122 so as to supply the lubricating oil to the countershaft 71 of the transmission 65. The counter lubricating-oil passage 123 includes a first shared lubricating-oil passage 125 that is shared with the idler lubricating oil passage 122. The counter lubricating-oil passage 123 branches off from the first shared lubricating-oil passage 125 and reaches the countershaft 71.

The lubrication system 91 further includes a balancer lubricating-oil passage 126 and a drive lubricating-oil passage 127. The balancer lubricating-oil passage 126 branching off from the main gallery 98 so as to supply the lubricating oil to the first balancer 85, and the drive lubricating-oil passage 127 branches off from the balancer lubricating-oil passage 126 so as to supply the lubricating oil to the driveshaft 72 of transmission 65. The drive lubricating-oil passage 127 includes a second shared lubricating-oil passage 128 that is shared with the balancer lubricating-oil passage 126. The drive lubricating-oil passage 127 branches off from the second shared lubricating-oil passage 128 and reaches the driveshaft 72.

The idler lubricating-oil passage 122 and the balancer lubricating oil passage 126 are independent of each other as separate passages, and separately branch off from the main gallery 98. That is, the idler lubricating-oil passage 122 and the balancer lubricating-oil passage 126 do not join together before the idler lubricating-oil passage 122 reaches the idler gear 83, and do not join together before the balancer lubricating-oil passage 126 reaches the first balancer 85. The idler lubricating-oil passage 122 reaches one of the right and left shaft-end portions of the idler gear 83, e.g., the right end shaft portion 83a. The balancer lubricating-oil passage 126 reaches one of the right and left shaft-end portions of the first balancer 85, e.g., the right shaft-end portion 85a.

Figure 8:
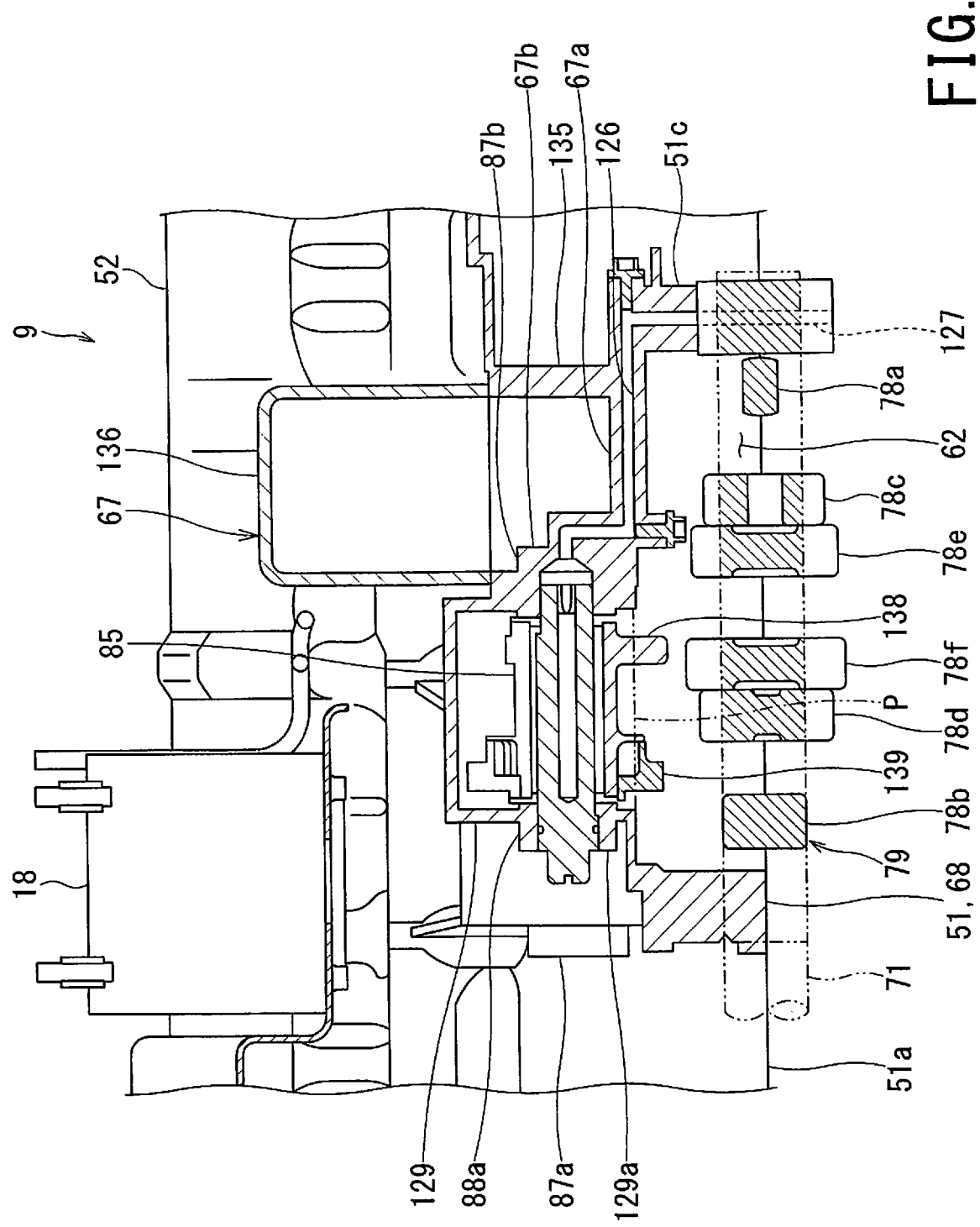
FIG. 8 is a partial cross-sectional view of the lubrication system of the internal combustion engine according to the embodiment of the present invention.

The balancer lubricating-oil passage 126 passes through one of the right and left side-walls of the crankcase 51, e.g., the right side-wall 51c (FIG. 8). In other words, the balancer lubricating-oil passage 126 has a portion formed inside either the right or left side-wall of the crankcase 51, e.g., the right side-wall 51c. Among the respective portions of the balancer lubricating-oil passage 126, the portion formed in the right side-wall 51c corresponds to the second shared lubricating-oil passage 128. The second shared lubricating-oil passage 128 passes through the right side-wall 51c on the far side from the first balancer 85 among one of the right and left side-walls of the crankcase 51.

The idler lubricating-oil passage 122 passes through the inside of any one of the right side-wall of the crankcase 51, left side-wall of the crankcase 51, and a bulkhead that is positioned in the middle of the right and left side-walls of the crankcase 51 and separates the crank chamber 61. For instance, the idler lubricating-oil passage 122 passes through the inside of the bulkhead adjacent to the right side-wall 51c. In other words, the idler lubricating-oil passage 122 includes a portion that is formed inside any one of the right side-wall of the crankcase 51, left side-wall of the crankcase 51, and the bulkhead that partitions the crankcase 51 and is positioned in the middle of the right and left side-walls of the crankcase 51. For instance, the idler lubricating-oil passage 122 includes a portion that is formed inside the bulkhead adjacent to the right side-wall 51c. Among the respective portions of the idler lubricating-oil passage 122, the portion formed inside the side-walls or the bulkhead corresponds to the first shared lubricating-oil passage 125.

The idler lubricating-oil passage 122 may pass through the journal portion 99 of the crankcase 51. In other words, the idler lubricating-oil passage 122 may include a portion formed in the journal portion 99 of the crankcase 51. In this case, among the respective portions of the idler lubricating oil passage 122, the portion formed in the journal portion 99 corresponds to the first shared lubricating-oil passage 125.

The first balancer 85 is disposed at a position closer to one of the side-walls than the idler gear 83, e.g., closer to the right side-wall 51c. That is, the first balancer 85 is closer to the second shared lubricating-oil passage 128 than the idler gear 83.

The counter lubricating-oil passage 123 branches off from the idler lubricating-oil passage 122 and reaches the shaft-end portion on the left side of the countershaft 71.

The drive lubricating-oil passage 127 branches off from the balancer lubricating-oil passage 126 and reaches the shaft-end portion on the right side of the driveshaft 72.

The counter lubricating-oil passage 123 may branch off from the balancer lubricating-oil passage 126. That is, the counter lubricating-oil passage 123 may share the first shared lubricating-oil passage 125 with the balancer lubricating-oil passage 126. Further, the drive lubricating oil-passage 127 may branch off from the idler lubricating-oil passage 122. That is, the drive lubricating-oil passage 127 may share the second shared lubricating-oil passage 128 with the idler lubricating-oil passage 122. In other words, the lubrication system 91 includes: the counter lubricating-oil passage 123 that contains the first shared lubricating-oil passage 125 shared with one of the idler lubricating-oil passage 122 and the balancer lubricating-oil passage 126 and branches off from the first shared lubricating-oil passage 125 so as to reach the countershaft 71; and the drive lubricating-oil passage 127 that contains the second shared lubricating-oil passage 128 shared with the other of the idler lubricating oil-passage 122 and the balancer lubricating-oil passage 126 and branched off from the second shared lubricating-oil passage 128 so as to reach the driveshaft 72.

FIG. 8 is a partial cross-sectional view of the lubrication system of the internal combustion engine according to the embodiment of the present invention.

FIG. 8 is a transverse sectional view of the engine 9. The cross-section illustrated in FIG. 8 intersects with the rotation center line of the first balancer 85 and is orthogonal to the mating surface 51a of the crankcase 51.

The crankcase 51 includes a balancer housing 129 that accommodates the first balancer 85 and is spatially connected to the transmission chamber 62. The left side-wall portion of the balancer housing 129 includes a through hole 129a through which the left shaft-end portion of the first balancer 85 protrudes from the housing.

The breather chamber 67 is partitioned by a lower-half partition-wall 135 that projects from the top surface of the upper case 68 and partitions a space opened upward (i.e., the lower half of the breather chamber 67), and a breather cover 136 that closes the lower-half partition-wall 135 from above. The lower-half partition-wall 135 is formed integrally with the upper case 68. The breather cover 136 closes the lower-half partition-wall 135 and is fixed to the upper case 68 with non-illustrated fastening members such as bolts and screws.

The balancer housing 129 and the breather chamber 67 are juxtaposed in the width direction of the crankcase 51. The right side-wall of the balancer housing 129 faces the left side-wall of the breather chamber 67.

One of the balancer bearings 88a and 88b, e.g., the right balancer bearing 88b is integrally formed with the wall that partitions the breather chamber 67. The right balancer bearing 88b is integrally formed with the left side-wall of the breather chamber 67. The right balancer bearing 88b is integrally formed with the lower-half partition-wall 135 that partitions the lower half portion of the breather chamber 67.

The balancer lubricating-oil passage 126 crosses the breather chamber 67 in a plan view of the crankcase 51 and reaches the first balancer 85. In other words, in the width direction of the engine 9 (i.e., the right-and-left direction of the engine 9 or the rotation-center-line direction of the crankshaft 63), the breather chamber 67 is sandwiched between the first balancer 85 and the second shared lubricating-oil passage 126 that is shared by the drive lubricating-oil passage 127 and the balancer lubricating-oil passage 126.

The balancer lubricating oil-passage 126 passes through the inside of the bottom wall 67a of the breather chamber 67. The balancer lubricating-oil passage 126 passes through the inside of the bottom wall 67a of the breather chamber 67, rises within the left side-wall 67b of the breather chamber 67, extends along the right balancer bearing 88b at this rising portion, and reaches the right shaft-end portion of the first balancer 85.

The first balancer 85 is disposed right above the counter gear 79. The first balancer 85 may be disposed right above the drive gear 81 or may be disposed right above both of the counter gear 79 and the drive gear 81 so as to straddle both. In other words, it suffices that the first balancer 85 is disposed right above at least one of the counter gear 79 and the drive gear 81.

The first balancer 85 protrudes from the balancer housing 129 and enters the inside of the transmission chamber 62. That is, the first balancer 85 protrudes from the imaginary plane P as the lower end face of the balancer housing 129 and enters the inside of the transmission chamber 62.

A weight 138 of the first balancer 85 is disposed right above the higher speed of the gear pairs 78 in the transmission gear 75. The weight 138 extends radially outwardly of the first balancer 85. For instance, the weight 138 is disposed right above the fourth to sixth gear pairs 78 in the six-speed transmission 65 capable of shifting from the first speed to the sixth speed. Instead of the weight 138, a balancer gear 139 may be disposed right above the higher speed of the gear pairs 78 in the transmission gear 75.

The motorcycle 1 according to the present embodiment includes the idler gear 83 disposed at the rear of the crankshaft 63 and the first balancer 85 disposed at the rear of the idler gear 83. The idler gear 83 and the first balancer 85 are disposed along the ceiling wall 51b of the crankcase 51. Consequently, the idler gear 83 and the first balancer 85 of the motorcycle 1 is more reduced in terms of amount of upward protrusion in the rear of the cylinder 52 than the conventional vehicle. That is, the motorcycle 1 can easily leave a space margin behind the cylinder 52 and above the crankcase 51. This spatial margin facilitates an increase in capacity of the fuel tank 12, leaving a mounting space for the intake system 11 of the engine 9 including the air cleaner 25 and the throttle body 27, and leaving another mounting space for equipment such as the anti-lock and brake system 18, and thus increases the degree of freedom of these arrangements.

Additionally, the motorcycle 1 according to the present embodiment includes the breather chamber 67 that covers at least a part of the first balancer 85 in a side view of the engine 9. That is, the first balancer 85 and the breather chamber 67 of the motorcycle 1 are collectively arranged and compactly assembled. Consequently, the motorcycle 1 can more easily leave a space margin behind the cylinder 52 and above the crankcase 51.

Further, the motorcycle 1 according to the present embodiment includes the breather chamber 67 that is offset to one of the right and left sides from the center line extending in the front-and-rear direction of the body frame 2, and the first balancer 85 that is disposed on the other of the right and left sides of the breather chamber 67. In other words, the breather chamber 67 and the first balancer 85 are arranged so as to be distributed to the respective right and left sides of the motorcycle 1. Consequently, the motorcycle 1 can easily achieve both of leaving a space margin behind the cylinder 52 and above the crankcase 51 and increasing the capacity of the breather chamber 67.

Moreover, the motorcycle 1 according to the present embodiment includes the anti-lock brake system 18 that covers at least a part of the first balancer 85 in a plan view of the body frame 2. Consequently, the motorcycle 1 brings the center of gravity of the anti-lock braking system 18 closer to the center of gravity of the engine 9, also brings the center of gravity of the anti-lock braking system 18 closer to the center of gravity of the whole vehicle, and improves its movement performance.

Furthermore, the motorcycle 1 according to the present embodiment includes the anti-lock brake system 18 that covers at least a part of the first balancer 85 in a plan view of the body frame 2 and covers at least a part of the breather chamber 67 in a side view of the body frame 2. Consequently, the motorcycle 1 brings the center of gravity of the anti-lock braking system 18 closer to the center of gravity of the engine 9, also brings the center of gravity of the anti-lock braking system 18 closer to the center of gravity of the whole vehicle, and improves its movement performance. In addition, the breather chamber 67 of the motorcycle 1 is adapted to the arrangement of the anti-lock brake system 18 and can leave a large capacity. Since the anti-lock brake system 18 and the breather chamber 67 are collectively arranged so as to be close to each other in the motorcycle 1, the motorcycle 1 facilitates the layout of peripheral components such as a non-illustrated battery and the rear cushion unit 33 provided at the rear of them, the air cleaner 25, the throttle body 27, and the fuel tank 12 provided above them.

Therefore, the motorcycle 1 according to the present embodiment includes the balancer mechanism 66 for reducing the vibration of the engine 9, and can leave a space margin for increasing the fuel tank in size and/or arranging equipment or components at the rear of the cylinder and above the crankcase.

Note that the vehicle according to the present embodiment is not limited to the motorcycle 1 but may be any of various types of vehicles such as a saddle-ride type tricycle and a four-wheeled vehicle.

The invention claimed is:

1. A vehicle comprising:
   a body frame; and
   an internal combustion engine mounted on the body frame,
   wherein the internal combustion engine comprises a crankcase with a ceiling wall, a crankshaft provided and rotatably supported in the crankcase, and a balancer mechanism provided in the crankcase and configured to reduce vibration of the internal combustion engine by power transmitted from the crankshaft;
   wherein the balancer mechanism comprises an idler gear disposed behind and above the crankshaft and rotated by power transmitted from the crankshaft, and a balancer disposed behind the idler gear and rotated by power transmitted from the idler gear;
   wherein the idler gear and the balancer are disposed along the ceiling wall, and
   wherein the balancer is disposed such that a rotation center line of the balancer is below an imaginary line segment connecting a rotation center line of the crankshaft and a rotation center line of the idler gear.

2. The vehicle according to claim 1, further comprising:
   a cylinder provided on a front end portion of a top surface of the crankcase; and a breather chamber provided on the top surface of the crankcase, disposed behind the cylinder, and covering at least a part of the balancer in a side view of the internal combustion engine.

3. The vehicle according to claim 2,
wherein the breather chamber is offset to one of right and left sides from a center line extending in a front-and-rear direction of the body frame; and
wherein the balancer is disposed on another of right and left sides of the breather chamber.

4. The vehicle according to claim 1, further comprising an anti-lock brake system supported by the body frame, disposed above a ceiling wall of the crankcase in a side view of the body frame, and covering at least a part of the balancer in a plan view of the body frame.

5. The vehicle according to claim 2, further comprising an anti-lock brake system that is supported by the body frame, covers at least a part of the balancer in a plan view of the body frame, covers at least a part of the breather chamber in a side view of the body frame, and disposed above a ceiling wall of the crankcase in a side view of the body frame.

6. The vehicle according to claim 2, further comprising an anti-lock brake system supported by the body frame, disposed above a ceiling wall of the crankcase in a side view of the body frame, and covering at least a part of the balancer in a plan view of the body frame.

7. The vehicle according to claim 3, further comprising an anti-lock brake system supported by the body frame, disposed above a ceiling wall of the crankcase in a side view of the body frame, and covering at least a part of the balancer in a plan view of the body frame.

8. The vehicle according to claim 3, further comprising an anti-lock brake system that is supported by the body frame, covers at least a part of the balancer in a plan view of the body frame, covers at least a part of the breather chamber in a side view of the body frame, and disposed above a ceiling wall of the crankcase in a side view of the body frame.

9. The vehicle according to claim 1, wherein an entirety of the balancer is disposed below the imaginary line segment.

10. A vehicle comprising:
a body frame;
an internal combustion engine mounted on the body frame; and
an anti-lock brake system supported by the body frame,
wherein the internal combustion engine comprises a crankcase with a ceiling wall, a crankshaft provided and rotatably supported in the crankcase, and a balancer mechanism provided in the crankcase and configured to reduce vibration of the internal combustion engine by power transmitted from the crankshaft;
wherein the balancer mechanism comprises an idler gear disposed behind and above the crankshaft and rotated by power transmitted from the crankshaft, and a balancer disposed behind the idler gear and rotated by power transmitted from the idler gear;
wherein the idler gear and the balancer are disposed along the ceiling wall, and
wherein the anti-lock brake system is disposed above a ceiling wall of the crankcase in a side view of the body frame and covers at least a part of the balancer in a plan view of the body frame.

11. The vehicle according to claim 10, further comprising:
a cylinder provided on a front end portion of a top surface of the crankcase; and
a breather chamber provided on the top surface of the crankcase, disposed behind the cylinder, and covering at least a part of the balancer in a side view of the internal combustion engine.

12. The vehicle according to claim 11,
wherein the breather chamber is offset to one of right and left sides from a center line extending in a front-and-rear direction of the body frame; and
wherein the balancer is disposed on another of right and left sides of the breather chamber.

\* \* \* \* \*